United States Patent [19]

Okubo et al.

[11] Patent Number: 5,145,589
[45] Date of Patent: Sep. 8, 1992

[54] SOLID-LIQUID SEPARATOR AND PROCESS FOR WASHING THE SAME

[75] Inventors: Yasuhiro Okubo; Takashi Itoh, both of Tokyo, Japan

[73] Assignee: Nishihara Environmental Sanitation Research Corporation Limited, Tokyo, Japan

[21] Appl. No.: 697,528

[22] Filed: Apr. 29, 1991

[51] Int. Cl.⁵ ............................................. B01D 24/46
[52] U.S. Cl. ..................................... 210/795; 210/797; 210/798
[58] Field of Search ............... 210/274, 275, 792, 793, 210/794, 795, 796, 797, 798, 807

[56] References Cited

U.S. PATENT DOCUMENTS

| | | | |
|---|---|---|---|
| 3,557,955 | 1/1971 | Hirs et al. | 210/276 |
| 3,846,305 | 11/1974 | Schreiber et al. | 210/150 |
| 3,882,027 | 5/1975 | Lunt | 210/150 |
| 4,052,300 | 10/1977 | Mosso | 210/786 |
| 4,115,266 | 9/1978 | Ohshima | 210/786 |
| 4,157,959 | 6/1979 | Wen et al. | 210/807 |
| 4,198,301 | 4/1980 | Iwatani | 210/274 |
| 4,246,118 | 1/1981 | Tada et al. | 210/275 |
| 4,438,000 | 3/1984 | Fan et al. | 210/807 |
| 4,454,040 | 6/1984 | Roberts | 210/283 |
| 4,547,286 | 10/1985 | Hsiung | 210/786 |
| 4,597,286 | 10/1985 | Hsiung | 210/792 |
| 4,604,197 | 8/1986 | Louboutin et al. | 210/275 |
| 4,608,181 | 8/1986 | Hsiung et al. | 210/786 |
| 4,624,789 | 11/1986 | Fan et al. | 210/661 |
| 4,719,020 | 1/1988 | Elmaleh | 210/807 |
| 4,826,609 | 5/1989 | Hensley | 210/792 |
| 4,885,083 | 12/1989 | Banks | 210/289 |
| 5,009,776 | 4/1991 | Banks | 210/286 |

FOREIGN PATENT DOCUMENTS 63-232892  9/1988  Japan .

OTHER PUBLICATIONS

*Merk Index*, Merck & Co., 10th ed. (1983) p. 1092.

Primary Examiner—Stanley S. Silverman
Assistant Examiner—Cynthia L. Nessler
Attorney, Agent, or Firm—Whitham & Marhoefer

[57] ABSTRACT

A solid-liquid separator and a process for washing the same wherein SS (suspended solids) caught in space portions of a filter medium in a tank are caused to flow out from the space portions and be suspended while at least part of the filter medium is maintained in a fluidized state by air washing, and rapid drainage through a lower portion of the tank causes the SS in the suspended state to be rapidly removed without being again caught into the space portions of the filter medium.

3 Claims, 2 Drawing Sheets

SOLID-LIQUID SEPARATOR AND PROCESS FOR WASHING THE SAME

BACKGROUND OF THE INVENTION (1) Field of the Invention

This invention relates to a solid-liquid separator for use in a primary treatment of waste water containing solid matter, and to a process for washing the solid-liquid separator.

(2) Description of the Prior Art

A method of washing a downward flow type filter according to the prior art, based mainly on sand filtration, is shown in FIG. 5. The system shown in the figure comprises a tank 1 packed with a layer of sand 2, a washing water tank 3, a washing pump 4, a surface washing water pipe 5, a backwash pipe 6, control valves 7 to 9, and a backwash drain pipe 10.

In washing the filter, the washing pump 4 is operated and the control valves 7 to 9 are controlled, whereby washing water is first pumped up from the washing water tank 3 and is sprinkled through the surface washing water pipe 5 to wash the surface of the sand layer 2 (surface washing). Then, the washing water in the tank 3 is fed under high pressure through the back washing pipe 6, which serves also as a treated water pipe, into a lower portion of the sand layer 2, thereby washing the entire part of the sand layer 2 (back washing). In this step, the sand layer 2 is expanded, and the suspended solids (SS) caught in space portions in the sand layer 2 are removed from the space portions, to be discharged through the backwash drain pipe 10. In some cases, air washing is also used, prior to the washing with water.

The conventional method of washing a sand filter requires huge expenses for operation and maintenance, because the method uses a large amount of washing water for surface washing and back washing. In addition, the method requires additional equipment such as the washing water tank, washing pump, etc., leading to a high equipment cost as well as a problem on a spatial basis.

Meanwhile, in the sand filter, the capture of the suspended solids (SS) takes place concentratedly in the vicinity of the surface of the sand layer, and the SS are practically caught in voids between the grains of sand. Therefore, the above-mentioned washing with water is enough to remove the SS from the sand filter.

Referring to FIG. 4, there is shown a filter medium 11 which is used in a solid-liquid separator according to the present assignee's prior application [for instance, Japanese Patent Application Laid-Open (KOKAI) No. 63-32861 (1988)]. In use of such a filter medium, namely, a small cylindrical plastic filter medium having a specified gravity of not more than 1.0 and a void ratio of at least 70%, suspended solids are not only caught in the voids between the pieces of filter medium 11 but are caught, in considerable amounts, in space portions 11a constituting the interior of the cylindical pieces of filter medium 11. Besides, the SS are not only caught on the surface of the packed bed but are caught in a high density throughout the range of the packed bed (for instance, 1.5 to 2 m deep). In this case, therefore, it is impossible to achieve satisfactory removal of the SS from the space portions 11a of the filter medium 11 by the above-mentioned water washing.

SUMMARY OF THE INVENTION

This invention contemplates overcoming the above-mentioned problems.

It is an object of this invention to provide a solid-liquid separator and a process for washing the same by which it is possible to achieve satisfactory removal of suspended solids, without need for use of washing water.

In the process for washing a solid-liquid separator according to this invention, the entire part of a filter medium in a tank is maintained in a fluidized state by air washing. Then, with the fluidized state maintained, a liquid in the tank is rapidly drained through a lower portion of the tank until part or the entire part of the filter medium is exposed above the surface of the liquid.

The solid-liquid separator according to this invention comprises a bed packed with a buoyant filter medium having a specific gravity of not more than 1.0, wherein a required amount of the filter medium is so packes as to provide a non-packed zone between the lower end of the filter medium packed bed and a filter medium support plate disposed on the lower side of the filter medium packed bed, during a filtering step, and an air introducing pipe for backwash is disposed on the lower side of the filter medium support plate.

In this case, the filter medium is preferably so packed that the space ratio of the filter medium packed zone to the non-packed zone is in the range of from 1:1 to 1:6, as described in claim 6 of the appended claims.

Other objects and advantages of this invention will become apparent from the following detailed description of an embodiment of this invention, referring to the accompanying drawings.

PREFERRED EMBODIMENT OF THE INVENTION

Figure 1:
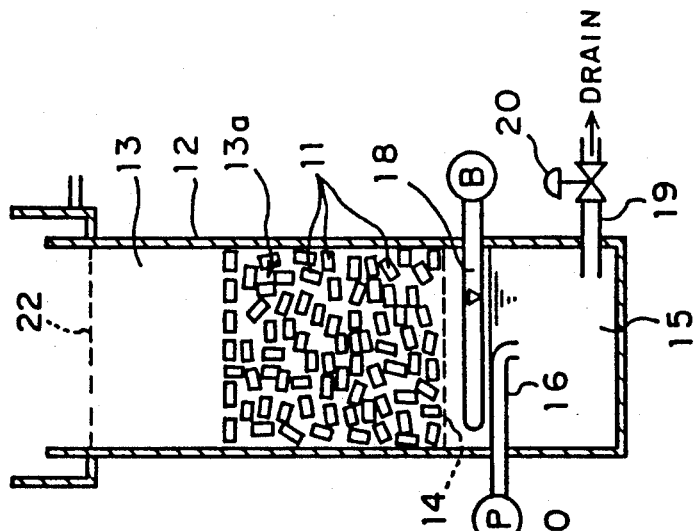
FIG. 1 is a sectional view of a solid-liquid separator according to one embodiment of this invention, in a filtering step.

One preferred embodiment of this invention will now be described below while referring to the drawings.

Figure 4:
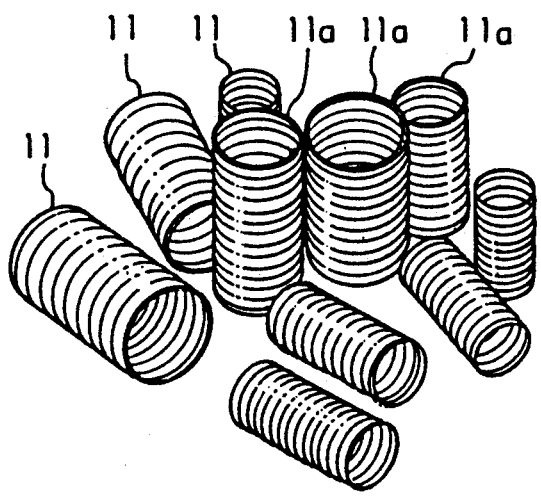
FIG. 4 is a perspective view of pieces of filter medium.
Figure 5:
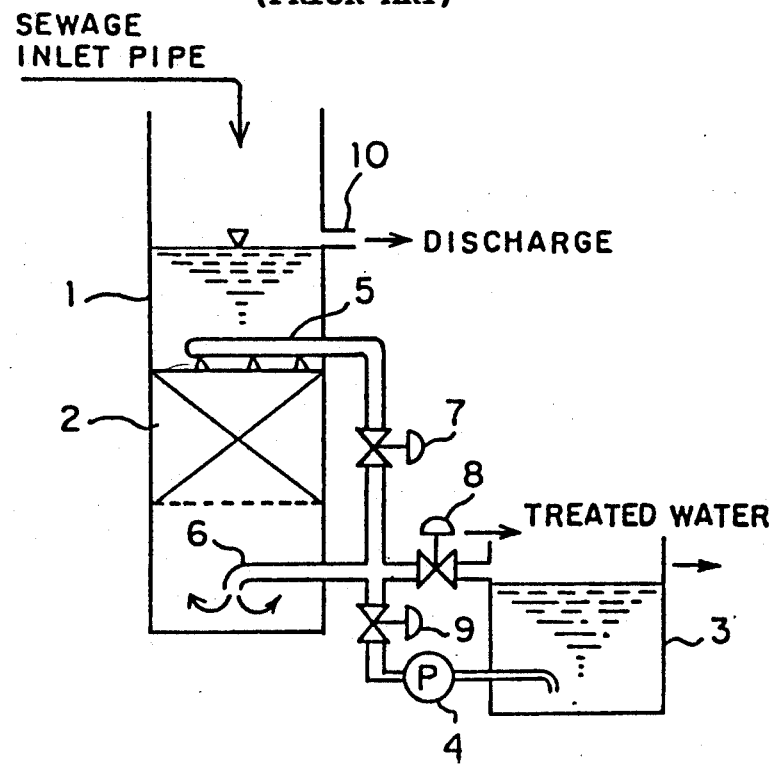
FIG. 5 is a sectional view of a filter according to the prior art.

This embodiment illustrates a solid-liquid separator, shown in FIG. 1. In the figure, a tank 12 is provided with a filter medium packed bed 13, a sedimentation zone 15 and the like. A required amount of a filter medium 11, shown in FIG. 4, is packed in the filter medium packed bed 13 between a top retainer plate 22 and a filter medium support plate 14.

The filter medium 11 occupies only part of the region in the filter medium packed bed 13 so that the pieces of filter medium 11 are capable of moving within the packed bed 13, as will be described later. The zone in which the pieces of filter medium 11 are packed in a cluster-like condition will be hereinafter referred to as "the filter medium packed zone 13a".

The top retainer plate 22 prevents the filter medium from flowing out through floating up. A sedimentation zone 15 is provided on the lower side of the filter medium support plate 14. An inlet pipe 16 is provided for feeding influent water into the sedimentation zone 15 by operating a pump P. An outlet pipe 17 is provided for discharge the treated water via an upper portion of the tank 12.

An air introducing pipe 18 is provided for introducing air into the sedimentation zone 15 below the filter medium support plate 14 by operating a blower B. A drain pipe 19 is provided with a drain valve 20 or a drain pump (not shown), for draining a liquid in the tank 12 via a lower portion of the tank.

A non-packed zone 21 is formed between the lower end of the filter medium packed zone 13a and the filter medium support plate 14, during a filtering step for the influent water. The required amount of the filter medium 11 is packed in the packed bed 13 so that the ratio of the volume A of the non-packed zone 21 to the volume B of the filter medium packed zone 13a is in the range of from 1:1 to 1:6.

The upward flow type solid-liquid separator operates as follows.

FIG. 1 shows the filtering step, in which the pump P is operated, whereby the influent water, or waste water containing solid matter, is fed into the sedimentation zone 15 via the inlet pipe 16. Of the solids contained in the influent water, those having a relatively high specific gravity are sedimented in the sedimentation zone 15. On the other hand, the influent water containing those solids having a lower specific gravity then flows upward through the filter medium packed bed 13, while the solids are caught in not only the voids between the pieces of filter medium 11 but the space portions 11a in the filter medium 11. Thus, the second solid-liquid separation takes place. The thus treated water is discharged through the outlet pipe 17.

In this case, the filter medium 11 has a very low specific gravity of not more than 1.0, with an extremely high void ratio of at least 70%. Further, the packing of the filter medium 11 in the packed bed 13 is so set that the ratio of the volume A of the non-packed zone 21 to the volume B of the packed zone 13a is in the range of from 1:1 to 1:6. Therefore, the filter medium 11 is floated up by the upward flow of the influent water to form a fixed bed beneath the top retainer plate 22, and the non-packed zone 21 is formed on the lower side of the fixed bed. Then, the SS are not only caught in the voids between the pieces of filter medium 11 but are trapped in a high concentration in the space portions 11a (See FIG. 4) in the filter medium 11.

Figure 2:
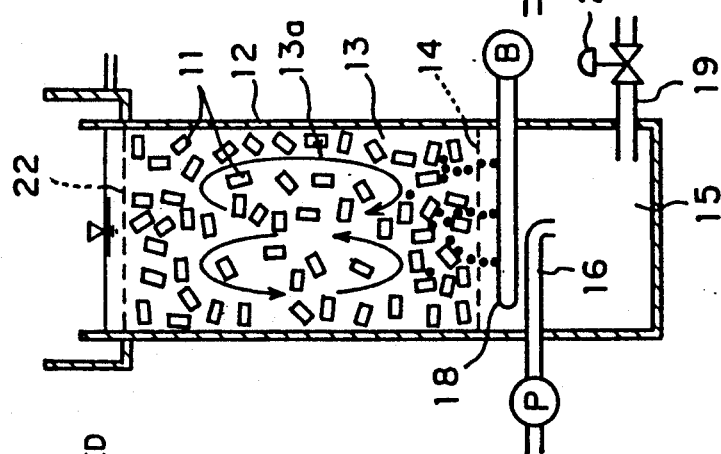
FIGS. 2 and 3 are each a sectional view of the solid-liquid separator in a washing step.
Figure 3:
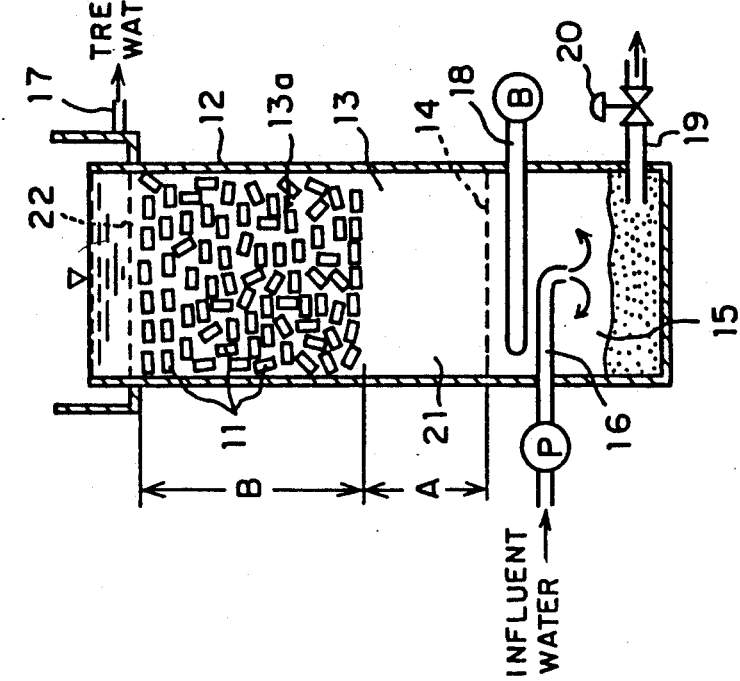

FIGS. 2 and 3 each show the washing step.

First, as shown in FIG. 2, the blower B is operated to introduce air through the air introducing pipe 18 into the sedimentation zone 15, to perform air washing (air washing step).

Since the ratio of the volume A of the non-packed zone 21, formed during the filtering step for the influent water, to the volume B of the filter medium packed zone 13 is controlled to within the range of from 1:1 to 1:6, the air washing causes the buoyant filter medium 11 having the specific gravity of 1.0 or below to be agitated sufficiently in the filter medium packed bed 13 including the non-packed zone 21 between the filter medium support plate 14 and the top retainer plate 22. Therefore, the filter medium 11 is brought into a satisfactorily fluidized state, and is circulated between the retainer plate 22 and the support plate 14. By the air washing, accordingly, not only the SS trapped in the voids between the pieces of filter medium 11 but the SS caught in the space portions 11a in the filter medium 11 are effectively caused to flow out from the voids and the space prtions, and are suspended in the filter medium packed bed 13.

In this case, further, the air introduced into the sedimentation zone 15 flows upward through the filter medium support plate 14, whereby washing of the support plate 14 is achieved simultaneously with the above-mentioned washing of the filter medium 11. Therefore, the filter medium support plate 14 is prevented from being clogged.

Next, while the SS are in the suspended state in the filter medium packed bed 13, as shown in FIG. 3, the drain valve 20 is opened or the drain pump (not shown) is operated, whereby the mixed water (tank liquid) in which the SS are suspended throughout the tank 12 is rapidly drained through the drain pipe 19 provided at the lower portion of the tank 12. As a result, the SS are also rapidly discharged together with the mixed water via the lower portion of the tank 12 (draining step).

During the draining step, a downward-flow filtration condition is established in the tank 12. Therefore, as the mixed water is drained, the entire body of the filter medium 11 is moved gradually downward, to be stopped on the filter medium support plate 14.

Accordingly, the mixed water should be drained at a considerably high velocity in order to prevent the SS suspended in the mixed water from being caught again into the space portions 11a in the filter medium 11. Thus, a drain velocity of at least about 0.3 m/min should be employed. In addition, the rapid draining of the mixed water should be continued until the water level is lowered to or below the filter medium support plate 14 and the entire body of the filter medium 11 is completely exposed above the water surface.

By the above washing step, it is possible to remove substantially all (100%) of the suspended solids.

Though the upward flow type solid-liquid separator using the small cylindrical plastic filter medium has been described in the embodiment above, this invention is applicable to any process for washing a solid-liquid separator which uses one of a variety of filter media formed of a plastic, polyethylene, polypropylene or the like having a specific gravity of not more than 1.0

As has been described above, according to this invention, not only the SS caught in the voids between the pieces of filter medium but the SS trapped in the space portions in the filter medium are caused to flow out from the voids or space portions and maintained in a suspended state by air washing, and rapid draining through a lower portion of the tank is carried out so that the SS in the suspended state are removed without being again trapped into the space portions of the filter medium. Therefore, it is possible to achieve a staisfactory, almost 100% SS removal, according to the invention, even in the cases of using a filter medium with a high void ratio and with any complicated shape. Besides, this invention realizes a marked reduction in cost, because washing water is not used. Also, there is the effect of reducing equipment cost and space required, because the need for auxiliary equipment such as a washing water tank, a washing pump, etc. is eliminated.

Furthermore, the rapid draining of the tank liquid via the lower portion of the tank according to this invention ensures that the SS in the above-mentioned suspended state are rapidly removed without being again caught into the space portions in the filter medium.

According to the invention, the void ratio of the filter medium is at least 70%, whereby it is possible to catch effectively the SS contained in the influent water.

Besides, the amount of the filter medium packed in the tank is so set that the space ratio of the non-packed zone to the filter medium packed zone is in the range of from 1:1 to 1:6, according to the invention. This setting ensures sufficient agitation of the filter medium in the tank, and effective washing of the filter medium.

According to another aspect of this invention, at the time of washing the filter medium by air washing, it is possible to agitate sufficiently the entire body of the filter medium into a satisfactorily fluidized state. This ensures that not only the SS caught in the voids between the pieces of filter medium but the SS trapped in the space portion of the filter medium are capable of being brought into the suspended state. In addition, the tank liquid is rapidly drained through a lower portion of the tank. Therefore, it is possible to wash the filter medium effectively and to remove the SS satisfactorily.

Moreover, prevention of the clogging of the filter medium support plate is achieved simultaneously with the washing of the filter medium, by air washing. This ensures easy maintenance.

What is claimed is:

1. A method of separating suspended solids from a liquid comprising the steps:

introducing said liquid into a tank so that said liquid flows upwardly toward the top of said tank and passes through a filter bed comprised of filter medium pieces having a high void ratio and a specific gravity of one or less so that said bed floats in said liquid with the bed occupying only a portion of said tank, periodically washing said tank to remove suspended solids trapped by said floating filter bed including the steps;

first injecting sufficient air into said liquid to agitate said filter medium pieces and disperse said pieces throughout the liquid in said tank; and next draining said liquid from said tank at a rate of at least 0.3 m/min while continuing to inject air into said liquid to agitate said filter medium pieces until all or substantially all of said filter medium pieces are exposed above the surface of said liquid.

2. A method of separating suspended solids from a liquid as in claim 1, wherein the ratio of the occupied portion of said tank to the unoccupied portion of said tank is in a range between 1:1 and 6:1.

3. A method of separating suspended solids from a liquid as in claim 1, wherein the void ratio of the filter medium pieces is at least 70%.

* * * * *